US010051350B2

(12) United States Patent
Stapleton et al.

(10) Patent No.: US 10,051,350 B2
(45) Date of Patent: *Aug. 14, 2018

(54) DATA TRANSPORT IN A VIRTUALIZED DISTRIBUTED ANTENNA SYSTEM

(71) Applicant: Dali Systems Co. Ltd., George Town, Grand Cayman (KY)

(72) Inventors: Shawn Patrick Stapleton, Vancouver (CA); Sasa Trajkovic, Burnaby (CA)

(73) Assignee: Dali Systems Co. Ltd., George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/445,467

(22) Filed: Feb. 28, 2017

(65) Prior Publication Data
US 2017/0303019 A1 Oct. 19, 2017

Related U.S. Application Data

(63) Continuation of application No. 14/678,779, filed on Apr. 3, 2015, now Pat. No. 9,621,971, which is a
(Continued)

(51) Int. Cl.
*H04J 14/00* (2006.01)
*H04Q 11/00* (2006.01)
(Continued)

(52) U.S. Cl.
CPC ... *H04Q 11/0067* (2013.01); *H04B 10/25753* (2013.01); *H04B 10/27* (2013.01);
(Continued)

(58) Field of Classification Search
CPC .......... H04B 10/2575; H04B 10/25752; H04B 10/25753; H04B 10/25754;
(Continued)

(56) References Cited

U.S. PATENT DOCUMENTS 5,627,879 A * 5/1997 Russell ............... H04W 88/085
370/328
6,785,558 B1 8/2004 Stratford et al.
(Continued)

FOREIGN PATENT DOCUMENTS

CN 1524390 8/2004
CN 101237631 8/2008
(Continued)

OTHER PUBLICATIONS

U.S. Appl. No. 13/754,702 , "Non Final Office Action", dated Jun. 5, 2014, 11 pages.
(Continued)

*Primary Examiner* — Hanh Phan
(74) *Attorney, Agent, or Firm* — Kilpatrick Townsend & Stockton LLP

(57) ABSTRACT

A system for routing signals in a Distributed Antenna System (DAS) includes one or more local Digital Access Units (DAUs) located at a local location and one or more remote DAUs located at one or more remote locations. Each of the one or more local DAUs includes an optical port coupled to an upstream unit. The upstream unit includes at least one of a repeater, a baseband unit, a Base Transceiver Station (BTS), or a DAU. The one or more remote DAUs are coupled to the one or more local DAUs via one or more optical cables. A distance between the local location and each of the one or more remote locations is greater than two kilometers.

19 Claims, 6 Drawing Sheets

Related U.S. Application Data continuation of application No. 13/754,702, filed on Jan. 30, 2013, now Pat. No. 9,025,956.

(60) Provisional application No. 61/592,747, filed on Jan. 31, 2012.

(51) Int. Cl.
| | | |
|---|---|---|
| *H04J 14/02* | (2006.01) | |
| *H04B 10/27* | (2013.01) | |
| *H04B 10/2575* | (2013.01) | |
| *H04W 40/02* | (2009.01) | |
| *H04W 88/08* | (2009.01) | |

(52) U.S. Cl.
CPC ...... *H04J 14/0286* (2013.01); *H04Q 11/0005* (2013.01); *H04W 40/02* (2013.01); *H04Q 2011/0016* (2013.01); *H04W 88/085* (2013.01); *Y02D 70/00* (2018.01); *Y02D 70/1242* (2018.01); *Y02D 70/1262* (2018.01); *Y02D 70/142* (2018.01); *Y02D 70/30* (2018.01)

(58) Field of Classification Search
CPC .......... H04Q 11/0005; H04Q 11/0067; H04Q 11/0066; H04W 88/085; H04W 52/42
USPC ........ 398/66, 67, 68, 69, 70, 71, 72, 79, 98, 398/99, 100, 45, 48, 49, 158, 159, 115, 398/116; 370/328, 329, 352, 392, 389, 370/468; 455/450, 445, 562.1, 509
See application file for complete search history.

(56) References Cited

U.S. PATENT DOCUMENTS

| | | | |
|---|---|---|---|
| 6,865,390 | B2 | 3/2005 | Goss et al. |
| 7,013,087 | B2 | 3/2006 | Suzuki et al. |
| 7,349,634 | B2 | 3/2008 | Sasai et al. |
| 8,098,990 | B2 | 1/2012 | Hu et al. |
| 9,025,956 | B2 * | 5/2015 | Stapleton ............... H04B 10/27 370/328 |
| 9,112,611 | B2 | 8/2015 | Palanisamy et al. |
| 9,537,572 | B2 * | 1/2017 | Stapleton ......... H04B 10/25754 |
| 9,621,971 | B2 * | 4/2017 | Stapleton ............... H04B 10/27 |
| 2002/0187809 | A1 | 12/2002 | Mani et al. |
| 2007/0008939 | A1 | 1/2007 | Fischer |
| 2007/0177552 | A1 | 8/2007 | Wu et al. |
| 2008/0232305 | A1 | 9/2008 | Oren et al. |
| 2009/0170543 | A1 | 7/2009 | Mostafa et al. |
| 2010/0278530 | A1 | 11/2010 | Kummetz et al. |
| 2011/0096736 | A1 | 4/2011 | Kwon et al. |
| 2011/0135308 | A1 | 6/2011 | Tarlazzi et al. |
| 2013/0017863 | A1 | 1/2013 | Kummetz et al. |
| 2013/0195467 | A1 | 8/2013 | Schmid et al. |
| 2014/0037292 | A1 | 2/2014 | Stapleton et al. |
| 2014/0072299 | A1 | 3/2014 | Stapleton et al. |
| 2014/0126914 | A1 * | 5/2014 | Berlin .............. H04B 10/25753 398/116 |
| 2015/0326957 | A1 | 11/2015 | Stapleton et al. |
| 2017/0104538 | A1 | 4/2017 | Stapleton et al. |

FOREIGN PATENT DOCUMENTS

| | | |
|---|---|---|
| CN | 101283551 | 10/2008 |
| CN | 101340647 | 1/2009 |
| CN | 101444121 | 5/2009 |
| CN | 101453799 | 6/2009 |
| CN | 101547447 | 9/2009 |
| CN | 102098080 | 6/2011 |
| EP | 1713290 | 10/2006 |
| JP | 2006094446 | 4/2006 |
| WO | 2004054290 | 6/2004 |
| WO | 2006102918 | 10/2006 |

OTHER PUBLICATIONS

U.S. Appl. No. 13/754,702 , "Notice of Allowance", dated Jan. 5, 2015, 5 pages.
U.S. Appl. No. 14/678,779 , "Final Office Action", dated Jun. 20, 2016, 13 pages.
U.S. Appl. No. 14/678,779 , "Non-Final Office Action", dated Sep. 10, 2015, 24 pages.
U.S. Appl. No. 14/678,779 , "Notice of Allowance", dated Nov. 30, 2016, 5 pages.
CN201380007517.7 , "Office Action", dated Aug. 10, 2015, 10 pages.
CN201380007517.7 , "Office Action", dated Mar. 2, 2016, 5 pages.
EP13744144.0 , "Extended European Search Report", dated Oct. 13, 2015, 9 pages.
JP2014-554989 , "Office Action", dated Dec. 19, 2016, 6 pages.
PCT/US2013/024151 , "International Search Report & Written Opinion", dated Apr. 19, 2013, 9 pages.
Japanese Patent Application No. JP2014-554989 , "Notice of Allowance", dated Jul. 11, 2017, 3 pages.

* cited by examiner

DATA TRANSPORT IN A VIRTUALIZED DISTRIBUTED ANTENNA SYSTEM

CROSS-REFERENCES TO RELATED APPLICATIONS

The present application is a continuation of U.S. patent application Ser. No. 14/678,779, filed Apr. 3, 2015, which is a continuation of U.S. patent application Ser. No. 13/754,702, filed on Jan. 30, 2013, which claims benefit under 35 U.S.C. § 119(e) of U.S. Provisional Patent Application No. 61/592,747, filed on Jan. 31, 2012. The disclosures of these applications are hereby incorporated by reference in their entirety for all purposes.

BACKGROUND OF THE INVENTION

Wireless communication systems employing Distributed Antenna Systems (DAS) are available. A DAS typically includes one or more host units, optical fiber cable or other suitable transport infrastructure, and multiple remote antenna units. A radio base station is often employed at the host unit location commonly known as a base station hotel, and the DAS provides a means for distribution of the base station's downlink and uplink signals among multiple remote antenna units. The DAS architecture with routing of signals to and from remote antenna units can be either fixed or reconfigurable.

A DAS is advantageous from a signal strength and throughput perspective because its remote antenna units are physically close to wireless subscribers. The benefits of a DAS include reducing average downlink transmit power and reducing average uplink transmit power, as well as enhancing quality of service and data throughput.

Despite the progress made in wireless communications systems, a need exists for improved methods and systems related to wireless communications.

SUMMARY OF THE INVENTION

The present invention generally relates to wireless communication systems employing Distributed Antenna Systems (DAS) as part of a distributed wireless network. More specifically, the present invention relates to a DAS utilizing a software configurable radio (SCR). In a particular embodiment, the present invention has been applied to the use of coupled remote Digital Access Units. The methods and systems described herein are applicable to a variety of communications systems including systems utilizing various communications standards.

Wireless and mobile network operators face the continuing challenge of building networks that effectively manage high data-traffic growth rates. Mobility and an increased level of multimedia content for end users typically employs end-to-end network adaptations that support new services and the increased demand for broadband and flat-rate Internet access. One of the most difficult challenges faced by network operators is caused by the physical movement of subscribers from one location to another, and particularly when wireless subscribers congregate in large numbers at one location. A notable example is a business enterprise facility during lunchtime, when a large number of wireless subscribers visit a lunch room or cafeteria location in the building. At that time, a large number of subscribers have moved away from their offices and usual work areas. It's likely that during lunchtime, there are many locations throughout the facility where there are very few subscribers. If the indoor wireless network resources were properly sized during the design process for subscriber loading as it is during normal working hours when subscribers are in their normal work areas, it is very likely that the lunchtime scenario will present some unexpected challenges with regard to available wireless capacity and data throughput.

According to an embodiment of the present invention, a system for routing signals in a Distributed Antenna System is provided. The system includes a plurality of local Digital Access Units (DAUs) located at a Local location. Each of the plurality of local DAUs is coupled to each other and operable to route signals between the plurality of local DAUs. Each of the plurality of local DAUs includes one or more Base Transceiver Station (BTS) RF connections, each of the plurality of BTS RF connections being operable to be coupled to one of one or more sectors of a BTS. The system also includes a plurality of remote DAUs located at a Remote location. The plurality of remote DAUs are coupled to each other and operable to transport signals between the plurality of remote DAUs.

According to another embodiment of the present invention, a system for routing signals in a Distributed Antenna System is provided. The system includes a plurality of local Digital Access Units (DAUs) located at a Local location. The plurality of local DAUs are coupled to each other and operable to route signals between the plurality of local DAUs. Each of the plurality of local DAUs have one or more RF input connections operable to receive an RF signal from a sector of a Base Transceiver Station (BTS). The system also includes a plurality of remote Digital Access Units (DAUs) located at a Remote location. The plurality of remote DAUs are coupled to the plurality of local DAUs and coupled to each other. The system further includes a plurality of DRUs arranged in cells. At least one of the plurality of DRUs is coupled to at least one of the plurality of remote DAUs.

According to a specific embodiment of the present invention, a system for routing signals in a Distributed Antenna System is provided. The system includes a first BTS having a plurality of sectors. Each of the plurality of sectors includes an RF port operable to receive an RF cable. The system also includes a second BTS having a plurality of sectors. Each of the plurality of sectors includes an RF port operable to receive an RF cable. The system further includes a first local DAU located at a Local location. The first local DAU is connected to an RF port of a first sector of the first BTS through an RF cable and an RF port of a first sector of the second BTS through an RF cable. Moreover, the system includes a second local DAU located at a Local location. The second local DAU is connected to an RF port of a second sector of the first BTS through an RF cable and an RF port of the second sector of the second BTS through an RF cable. The system also includes a communications media connecting the first local DAU and the second local DAU, a mux/demux coupled to the first local DAU and the second local DAU, a network connection between the mux/demux and a second mux/demux, and a plurality of remote DAUs located at a Remote location and connected to the second mux/demux. The plurality of remote DAUs are coupled to each other and to a server.

According to another specific embodiment of the present invention, a system for routing signals in a Distributed Antenna System is provided. The system includes an antenna operable to receive a signal from a Base Transceiver Station (BTS), an off air repeater coupled to the antenna, and a local Digital Access Units (DAU) coupled to the off air repeater. The system also includes a first multiplexer/demultiplexer coupled to the local DAU, a second multiplexer/demultiplexer coupled to the first multiplexer/demultiplexer, and a remote DAU coupled to the second multiplexer/demultiplexer. In an embodiment, the BTS is geographically separated from the location of the local DAU.

According to an alternative embodiment of the present invention, a system for routing signals in a Distributed Antenna System (DAS) is provided. The system includes a plurality of Base Transceiver Stations (BTS), each having one or more sectors and a plurality of BTS RF connections, each being coupled to one of the one or more sectors. The system also includes a plurality of local Digital Access Units (DAUs) located at a Local location. Each of the plurality of local DAUs is coupled to each other, operable to route signals between the plurality of local DAUs, and coupled to at least one of the plurality of BTS RF connections. The system further includes a plurality of remote DAUs located at a Remote location. The plurality of remote DAUs are coupled to each other and operable to transport signals between the plurality of remote DAUs.

According to another alternative embodiment of the present invention, a system for routing signals in a DAS is provided. The system includes a plurality of local Digital Access Units (DAUs) located at a Local location. The plurality of local DAUs are coupled to each other and operable to route signals between the plurality of local DAUs. The system also includes a plurality of remote Digital Access Units (DAUs) located at a Remote location coupled to each other and operable to transport signals between the remote DAUs and each other and a plurality of Base Transceiver Stations (BTS). The system further includes a plurality of Base Transceiver Station sector RF connections coupled to the plurality of local DAUs and operable to route signals between the plurality of local DAUs and the plurality of Base Transceiver Stations sector RF connections and a plurality of DRUs connected to a plurality of remote DAUs via at least one of a Ethernet cable, Optical Fiber, RF Cable, Microwave Line of Sight Link, Wireless Link, or Satellite Link.

According to yet another alternative embodiment of the present invention, a system for routing signals in a DAS is provided. The system includes a first BTS having a plurality of sectors and a second BTS having a plurality of sectors. Each of the plurality of sectors of the first BTS includes an RF port operable to receive an RF cable. Each of the plurality of sectors of the second BTS includes an RF port operable to receive an RF cable. The system also includes a first local DAU located at a Local location. The first local DAU is connected to an RF port of a first sector of the first BTS through an RF cable and an RF port of a first sector of the second BTS through an RF cable. The system further includes a second local DAU located at a Local location. The second local DAU is connected to an RF port of a second sector of the first BTS through an RF cable and an RF port of the second sector of the second BTS through an RF cable. Additionally, the system includes a communications media connecting the first local DAU and the second local DAU, a mux/demux coupled to the first local DAU and the second local DAU, a network connection between the mux/demux and a second mux/demux, and a plurality of remote DAUs located at a Remote location and connected to the second mux/demux. The plurality of remote DAUs are coupled to each other and to a server.

Numerous benefits are achieved by way of the present invention over conventional techniques. For instance, embodiments of the present invention can virtually transport the hotel base stations to a remote location, which may be a considerable distance from the physical location (e.g., kilometers of separation). Additionally, embodiments enable the routing capacity at the remote location. These and other embodiments of the invention along with many of its advantages and features are described in more detail in conjunction with the text below and attached figures.

DETAILED DESCRIPTION OF SPECIFIC EMBODIMENTS

Figure 1:
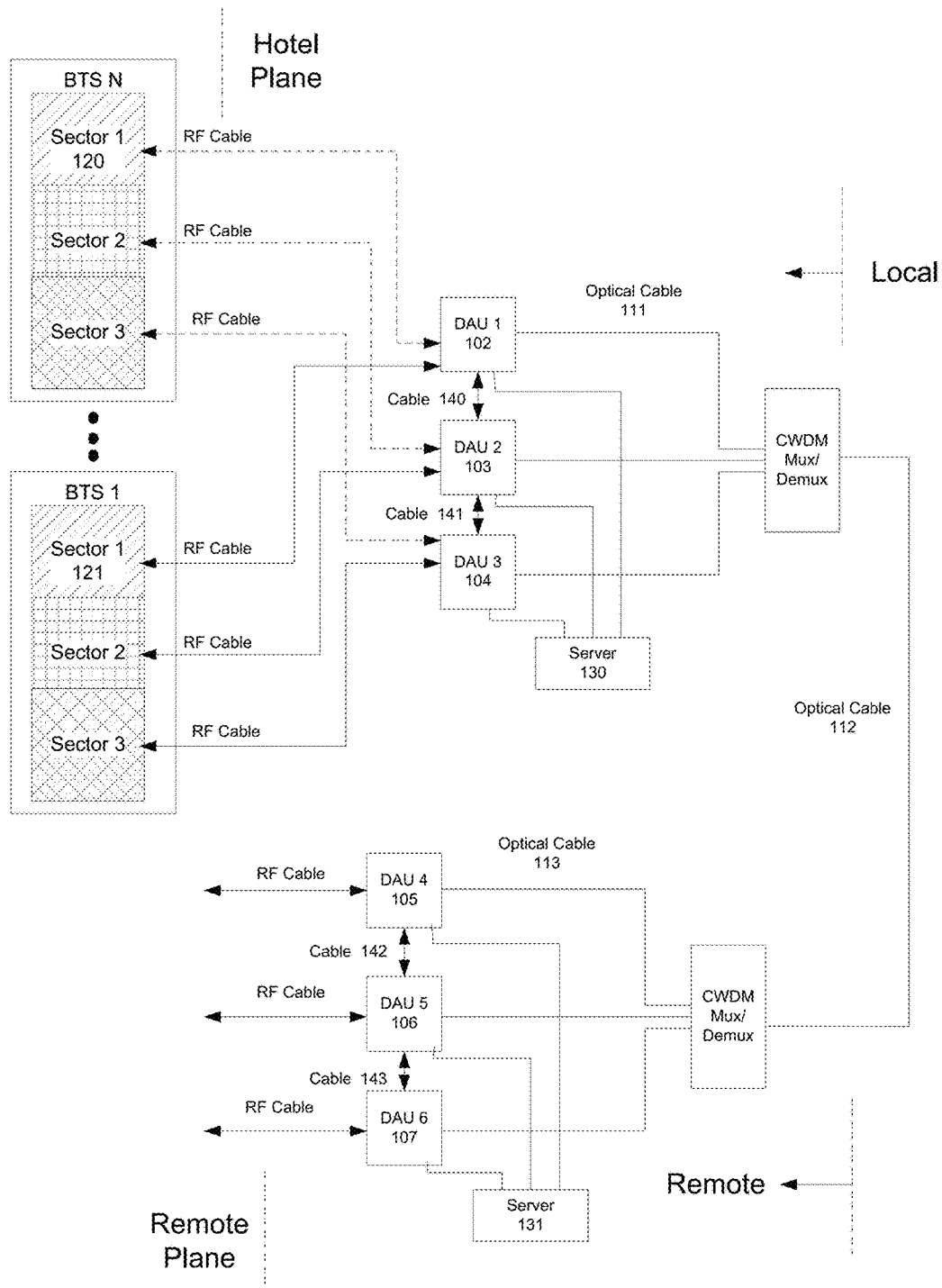
FIG. 1 is a block diagram according to one embodiment of the invention showing the basic structure and an example of the transport routing based on having multiple 3 sector BTSs with 3 Digital Access Units (DAUs) at a Local Location, 3 DAUs at a Remote Location and RF interfaces at the Remotes.

To accommodate variations in wireless subscriber loading at wireless network antenna locations at various times of day and for different days of the week, there are several candidate conventional approaches.

One approach is to deploy many low-power high-capacity base stations throughout the facility. The quantity of base stations is determined based on the coverage of each base station and the total space to be covered. Each of these base stations is provisioned with enough radio resources, i.e., capacity and broadband data throughput to accommodate the maximum subscriber loading which occurs during the course of the workday and work week. Although this approach typically yields a high quality of service for wireless subscribers, the notable disadvantage of this approach is that many of the base stations' capacity is being wasted for a large part of the time. Since a typical indoor wireless network deployment involves capital and operational costs which are assessed on a per-subscriber basis for each base station, the typically high total life cycle cost for a given enterprise facility is far from optimal.

A second candidate approach involves deployment of a DAS along with a centralized group of base stations dedicated to the DAS. A conventional DAS deployment falls into one of two categories. The first type of DAS is "fixed", where the system configuration doesn't change based on time of day or other information about usage. The remote units associated with the DAS are set up during the design process so that a particular block of base station radio resources is thought to be enough to serve each small group of DAS remote units. A notable disadvantage of this approach is that most enterprises seem to undergo frequent re-arrangements and re-organizations of various staff groups within the enterprise. Therefore, it's highly likely that the initial DAS setup will need to be changed from time to time, requiring deployment of additional direct staff and contract resources with appropriate levels of expertise regarding wireless networks.

The second type of DAS is equipped with a type of network switch which allows the location and quantity of DAS remote units associated with any particular centralized base station to be changed manually. Although this approach would appear to support dynamic DAS reconfiguration based on the needs of the enterprise or based on time of day, it frequently implies that additional staff resources would need to be assigned to provide real-time management of the network. Another issue is that it's not always correct or best to make the same DAS remote unit configuration changes back and forth on each day of the week at the same times of day. Frequently it is difficult or impractical for an enterprise IT manager to monitor the subscriber loading on each base station. And it is almost certain that the enterprise IT manager has no practical way to determine the loading at a given time of day for each DAS remote unit; they can only guess the percentage loading.

Another major limitation of conventional DAS deployments is related to their installation, commissioning and optimization process. Some challenging issues which must be overcome include selecting remote unit antenna locations to ensure proper coverage while minimizing downlink interference from outdoor macro cell sites, minimizing uplink interference to outdoor macro cell sites, and ensuring proper intra-system handovers while indoors and while moving from outdoors to indoors (and vice-versa). The process of performing such deployment optimization is frequently characterized as trial-and-error. Therefore, the results may not be consistent with a high quality of service.

According to embodiments of the present invention, a highly efficient, easily deployed and dynamically reconfigurable wireless network is provided. The advanced system architecture provided by embodiments of the present invention provides a high degree of flexibility to manage, control, enhance and facilitate radio resource efficiency, usage and overall performance of the distributed wireless network. This advanced system architecture enables specialized applications and enhancements including, but not limited to, flexible simulcast, automatic traffic load-balancing, network and radio resource optimization, network calibration, autonomous/assisted commissioning, carrier pooling, automatic frequency selection, radio frequency carrier placement, traffic monitoring, and/or traffic tagging. Embodiments of the present invention can also serve multiple operators, multi-mode radios (modulation-independent) and multiple frequency bands per operator to increase the efficiency and traffic capacity of the operators' wireless networks.

Accordingly, embodiments of the DAS network provide a capability for Flexible Simulcast. With Flexible Simulcast, the amount of radio resources (such as RF carriers, LTE Resource Blocks, CDMA codes or TDMA time slots) assigned to a particular DRU or group of DRUs can be set via software control to meet desired capacity and throughput objectives or wireless subscriber needs. Applications of the present invention are suitable to be employed with distributed base stations, distributed antenna systems, distributed repeaters, mobile equipment and wireless terminals, portable wireless devices, and other wireless communication systems such as microwave and satellite communications.

A distributed antenna system (DAS) provides an efficient means of utilization of base station resources. The base station or base stations associated with a DAS can be located in a central location and/or facility commonly known as a base station hotel. The DAS network comprises one or more digital access units (DAUs) that function as the interface between the base stations and the digital remote units (DRUs). The DAUs can be collocated with the base stations. The DRUs can be daisy chained together and/or placed in a star configuration and provide coverage for a given geographical area. The DRUs are typically connected with the DAUs by employing a high-speed optical fiber link. This approach facilitates transport of the RF signals from the base stations to a remote location or area served by the DRUs. A typical base station comprises 3 independent radio resources, commonly known as sectors. These 3 sectors are typically used to cover 3 separate geographical areas without creating co-channel interference between users in the 3 distinct sectors. In other embodiments, additional sectors are associated with each BTS, for example, up to or more than 12 sectors.

An embodiment shown in FIG. 1 illustrates a DAS network architecture according to an embodiment of the present invention and provides an example of a data transport scenario between multiple 3 sector Base Stations and multiple remotely located DAUs. BTSs 1 through N are connected to DAU1, DAU2, and DAU3 (i.e., local DAUs) by an RF cable in the illustrated embodiment. Each of the local DAUs are connected to server 130. A Coarse Wavelength Division Multiplexer/Demux (CWDM) is utilized to facilitate data transport over a single optical fiber 112 from the local location to the remote location. Another embodiment of the data transport system could use a Dense Wavelength Division Multiplexer (DWDM). In the illustrated embodiment, the DAUs at the Local location are coupled together using cables 140 and 141 to achieve routing of the RF signals. The DAUs at the Remote Location are coupled together using cables 142 and 143. In some embodiments, three sector BTSs are connected to a daisy chained group of DAUs at both the local and remote locations.

It should be noted that although FIG. 1 illustrates one or more BTSs 1 through N, the BTSs are not required by the present invention and some embodiments only include elements illustrated to the right of the Hotel Plane. As will be evident to one of skill in the art, the systems described herein can be operable to connect to BTSs that are provided by different entities, such as telecommunications operators. Thus, some embodiments utilize a DAU that has one or more BTS RF connections. Each of the one or more BTS RF connections is operable to be coupled to one of one or more sectors of a BTS. As described herein the connection between the BTS and the DAU can be made using an RF cable, or a combination of wireless and optical/RF cables depending on the particular implementation.

FIG. 1 depicts a DAS system employing multiple Digital Access Units (DAUs) at the Local location and multiple Digital Access Units (DAUs) at the Remote location. In accordance with the present invention, each DAU provides unique information associated with each DAU, which uniquely identifies data received and transmitted by a particular DAU. As illustrated in FIG. 1, the 3 sector base stations are connected to a daisy chained DAS network, although other configurations are included within the scope of the present invention.

One feature of embodiments of the present invention is the ability to route Base Station radio resources among the DAUs or group(s) of DAUs. In order to route radio resources available from one or more Base Stations, it is desirable to configure the individual router tables of the DAUs in the DAS network. This functionality is provided by embodiments of the present invention.

The DAUs are networked together to facilitate the routing of signals among multiple DAUs. The DAUs support the transport of the RF downlink and RF uplink signals between the Base Station and the various DAUs. This architecture enables the various Base Station signals to be transported simultaneously to and from multiple DAUs. PEER ports are used for interconnecting DAUs.

The DAUs have the capability to control the gain (in small increments over a wide range) of the downlink and uplink signals that are transported between the DAU and the base station (or base stations) connected to that DAU. This capability provides flexibility to simultaneously control the uplink and downlink connectivity of the path between a particular Remote DAU (or a group of DAUs) and a particular base station sector.

A single optical fiber can be used for the transportation of data between the Local DAUs and the Remote DAUs by using a Coarse Wavelength Division Multiplexer (CWDM) and De-multiplexer, connected, for example, through optical cable 112. Embodiments of the present invention are not limited to the use of an optical cable 112 and other communications media can be employed including Ethernet cable, Microwave Line of Sight Link, Wireless Link, Satellite Link, or the like.

Referring to FIG. 1, optical fiber 112 connects the local CWDM Mux/Demux to the Remote CWDM Mux/Demux. In the illustrated embodiment, three outputs are provided by the Remote CWDM Mux/Demux, for example, three different optical wavelengths. The optical cables 113 connect the Remote CWDM Mux/Demux to the remote DAUs (DAU 4, DAU 5, and DAU 6). Thus, embodiments of the present invention provide for Local DAUs (that can be connected to each other in the illustrated daisy chain or other configuration) that are connected to Remote DAUs, which can also be connecting to each other in a daisy chain or other configuration. As shown in FIG. 1, cables 140/141 and 142/143, which connect the Local and Remote DAUs, respectively, can be Ethernet cable, Optical cable, Microwave Line of Sight Link, Wireless Link, Satellite Link, or the like. Additionally, although the connections between the BTSs and the local DAUs are illustrated as RF cables, this is not required by embodiments of the present invention and other communications media can be utilized. Moreover, although the remote DAUs include an optical cable connection to the remote CWDM Mux/Demux and an RF cable in the Remote Plane, the connections in the Remote plane (e.g., to mobile access equipment) can be made using other communications media.

As illustrated in FIG. 1 at the Remote location, RF outputs are provided by the DAUs in the remote plane. In the illustrated embodiment, the DAUs are interconnected at the remote location (e.g., the DAUs are daisy chained at the remote location). Thus, in the embodiment illustrated in FIG. 1, the RF signals present in the Hotel Plane are replicated in the Remote Plane. In other words, embodiments of the present invention virtualize the Hotel Plane at the Remote Plane. As an example, the signals carried by the RF cable connecting Sector 1 (120) and DAU 1 (102) are available in the RF cable connected to DAU 4 (105). As a result, signals from BTS 1 through BTS N are virtually extended from the Hotel Plane to the Remote Plane, which may be physically separated by kilometers of distance, overcoming transmission loss and other adverse effects that would be produced if the RF cables connected to the BTSs were used in an attempt to bridge the distance between the Hotel Plane and the Remote Plane. The virtual extension of the Hotel Plane to the Remote Plane enables the RF cables in the Remote Plane to be connected to appropriate equipment, providing the BTSs virtually in the Remote Plane.

Embodiments of the present invention provide methods and systems that enable capacity shifting. As an example, a signal can be routed from BTS1, sector 1 (121), through an RF cable to DAU1 (102), transported over the optical fiber 111 through the Local CWDM Mux/Demux, over optical cable 112 to the Remote CWDM Mux/Demux, through optical cable 113 to DAU4 (105), and then routed down to DAU5 (106) via cable 142 and then output through the RF cable connected to DAU5. Thus, using embodiments of the present invention, it is possible to control the transmission of the signal at the remote location from any of the BTS sectors (e.g., BTS1, sector 1). As illustrated, embodiments of the present invention provide the flexibility to route signals from a predetermined RF input cable connected to the Local DAUs to a predetermined RF output cable connected to the Remote DAUs. Additionally, in the reverse direction, signals can be routed from a predetermined RF input cable connected to the Remote DAUs to a predetermined RF output cable connected to the Local DAUs. As an example, a signal could be received on the RF cable connected to DAU5 (106), routed to DAU4 (105), and then through the network. Thus, embodiments of the present invention provide the flexibility at the remote location to move capacity from one device to another, for example, if the remote DAUs are not physically in the same location, (e.g., DAU4 (105) is in one building, DAU5 (106) is located in another building, and DAU6 (107) is located in yet another building). In that case, flexibility is provided to be able to route signals in both directions onto different optical cables.

Referring to FIG. 1, embodiments of the present invention provide for a virtual extension or replication of the RF cables in the Hotel Plane to the RF cables in the Remote Plane. Thus, the BTSs have been virtually transported from the base station hotel to the remote location since the output of the RF cables in the Remote Plane can be identical to the inputs to the RF cables in the Hotel Plane, enabling interface with mobile access equipment. Although the connections in the Hotel Plane are illustrated as RF cables, this is not required by embodiments of the present invention and other communications media are included within the scope of the present invention, including Ethernet cable, Optical Fiber, Microwave Line of Sight Link, Wireless Link, or Satellite Link. In some embodiments, summing is utilized to provide a system in which a single DAU port is connected to a plurality of BTSs. For example, BTS 1, sector 1 (120), and BTS N, sector 1 (121) could be summed and then connected to a single port in DAU 1 (102).

According to embodiments of the present invention, DAUs are utilized at both the Local and Remote locations. The DAU communicates with a Network Operational Control (NOC). The NOC sends commands and receives information from the DAS network. The DAS network can include a plurality of DAUs and DRUs. The DAU communicates with the network of DRUs and the DAU sends commands and receives information from the DRUs. The DAUs include physical nodes that accept and deliver RF signals and optical nodes that transport data. A DAU can include an internal server or an external server. The server is used to archive information in a database, store the DAS network configuration information, and perform various traffic related processing. The server can be used to communicate information from the DAS Network to the NOC.

Additionally, the DRU communicates with the DAU. In some embodiments, the DRU does not communicate with the NOC. The DRU receives commands from the DAU and delivers information to the DAU. The DRUs include physical nodes that accept and deliver RF signals and optical nodes that transport data. As illustrated in FIG. 1, the use and connection of the DAUs to each other in the Remote location provide benefits not available in systems in which DRUs are utilized in the Remote location, for example, the use of server 131 in connection with the remote DAUs, since in some implementations, a server is not used with remote DRUs. In other implementations, the remote DRUs can be coupling to each other and can be connected to a server as discussed in relation to FIG. 3. As shown in FIG. 1, the remote DAUs are connected through cables 142 and 143.

Figure 6:
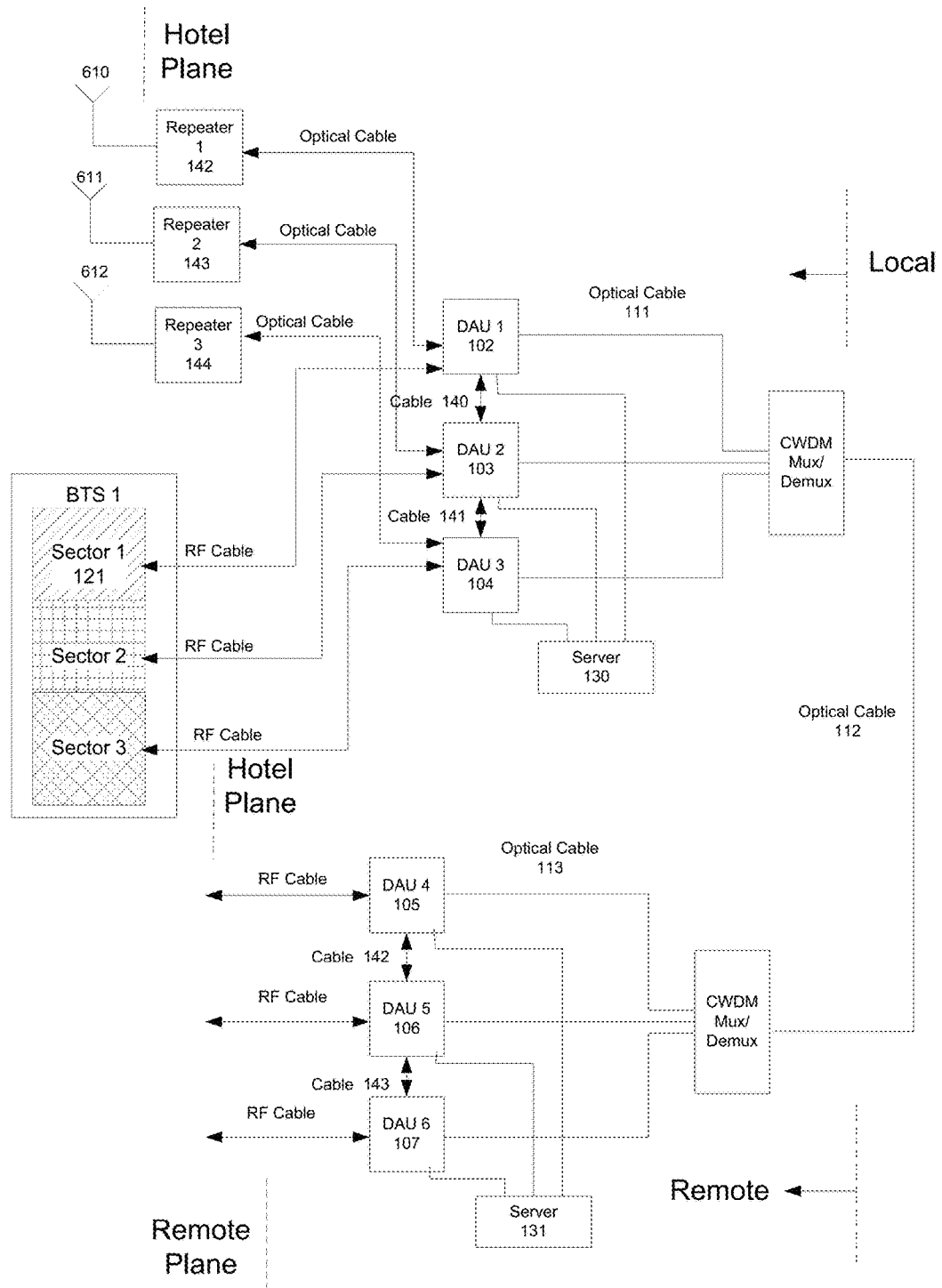
FIG. 6 is a block diagram illustrating a DAS system according to an embodiment of the present invention.

FIG. 6 is a block diagram illustrating a DAS system architecture according to an embodiment of the present invention. In this system, one or more of the connections between the BTS sectors and the DAU inputs utilize a wireless connection for at least a portion of the communication path. As illustrated in FIG. 6, one or more off air repeaters (Repeater 1 (142), Repeater 2 (143), and Repeater 3 (144)) receives an RF signal (e.g., an analog RF signal) from an antenna (antennas 610, 611, and 612). The off air repeater (which can be referred to simply as a repeater) receives the RF signal from the antenna and converts the RF signal into an optical signal that can be transported over an optical cable to a DAU (e.g., DAU 1 (102), DAU 2 (103), and DAU 3 (104). A BTS (not shown) located at a location that is geographically separated from the other system elements is coupled to an antenna (not shown) that transmits the wireless signals that are received by antennas 610, 611, or 612. Thereby, the sectors of the geographically separated BTS are in wireless communication with the off air repeaters through the corresponding set of antennas. Accordingly, this architecture enables an additional Hotel Plane located between the antennas 610, 611, and 612 and the off air repeaters 142, 143, and 144, effectively extending the original Hotel Plane defined by the RF connections from BTS 1 to the DAUs. As illustrated, a wireless connection is established between the sectors of the geographically separated BTS (now shown) and the off-air repeater. Using the off air repeaters, an optical connection is thereby established to the DAUs.

As an example, the geographically separated BTS (not shown) could be located at a given distance, for example, 2 km from the facilities containing the off air repeaters 142-144, which receive the wireless RF signals at their respective antennas from one of the sectors of the remote BTS, and the DAUs. These embodiments provide connectivity to a geographically separated BTS in conditions in which physically co-locating this BTS with the other equipment illustrated in FIG. 6, for example, the DAUs 1-3, is not convenient or expeditious.

Thus, the definition of Hotel Plane is not limited to the RF connections to the BTSs as discussed in relation to FIG. 1 and illustrated in FIG. 6, but also includes RF connections to one or more antennas that receive signals from a geographically separated BTS. It should be noted that the local DAU can include both one or more RF connections operable to receive an RF signal from a co-located BTS and one or more optical connections operable to receive an optical signal from an off air repeater, which can be in communication with a geographically separated BTS. One of ordinary skill in the art would recognize many variations, modifications, and alternatives.

As illustrated in FIG. 6, an optical fiber is used to connect Repeaters 1-3 (142, 143, and 144) to the DAUs 1-3 (102, 103, and 104). Therefore, the DAUs provide inputs for both RF cables, suitable for connections to BTSs, as well as optical cables, suitable for connections to off-air repeaters, which receive signals from remote BTSs.

Figure 2:
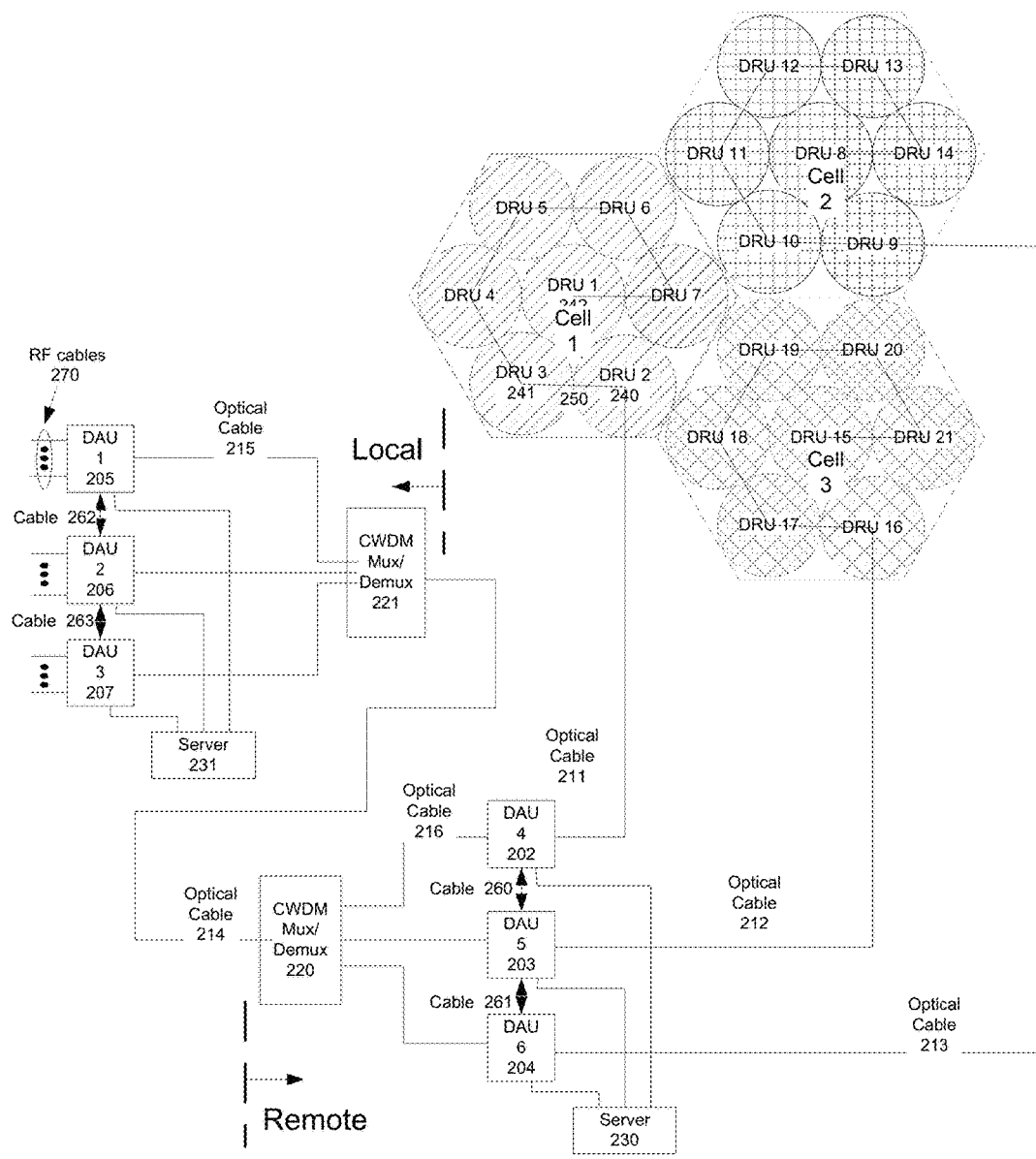
FIG. 2 is a block diagram according to one embodiment of the invention showing the basic structure and an example of the transport routing based on having multiple 3 sector BTSs with 3 DAUs at a Local Location, 3 DAUs at a Remote Location and Optical interfaces at the Remotes.

FIG. 2 is a block diagram according to one embodiment of the invention showing the basic structure and an example of the transport routing based on having multiple 3 sector BTSs with 3 DAUs at a Local Location, 3 DAUs at a Remote Location and Optical interfaces at the Remotes. As illustrated in FIG. 2, communication between the plurality of remote DAUs (i.e., DAU 4 (202), DAU 5 (203), and DAU 6 (204)) and the corresponding cells of DRUs (i.e., Cell 1, Cell 2, and Cell 3) is provided via optical cables 211, 212, and 213, respectively. Thus, this architecture provides communication to the mobile devices through the DRUs.

As shown in FIG. 2, the individual base station sector's radio resources are transported to a daisy-chained network of DRUs. Each individual sector's radio resources provide coverage to an independent geographical area via the networked DRUs. FIG. 2 demonstrates how three cells, each cell comprising an independent network of 7 DRUs, provide coverage to a given geographical area. A server is utilized to control the switching function provided in the DAS network. Referring to FIG. 2 and by way of example, DAU 1 (205) receives downlink signals and transmits uplink signals from and to BTS Sector 1 (120). DAU 1 translates the RF signals to optical signals for the downlink and translates the optical signals to RF signals for the uplink. The optical fiber cable (215) transports the desired signals to and from CWDM (221) whereby the distinct DAU optical wavelengths are multiplexed and de-multiplexed. Optical cable (214) transports all the optical signals between CWDM (221) and CWDM (220). DAU 4 (202) transports the optical signal to and from CWDM (220). DAU 4 (202) transports the uplink and downlink data to and from a daisy chain of DRUs. The other DRUs in the daisy chain are involved in passing the optical signals onward to DRU 1 (247). Although not illustrated in FIG. 2, it will be appreciated that RF cables 270 connect to the BTSs.

Figure 3:
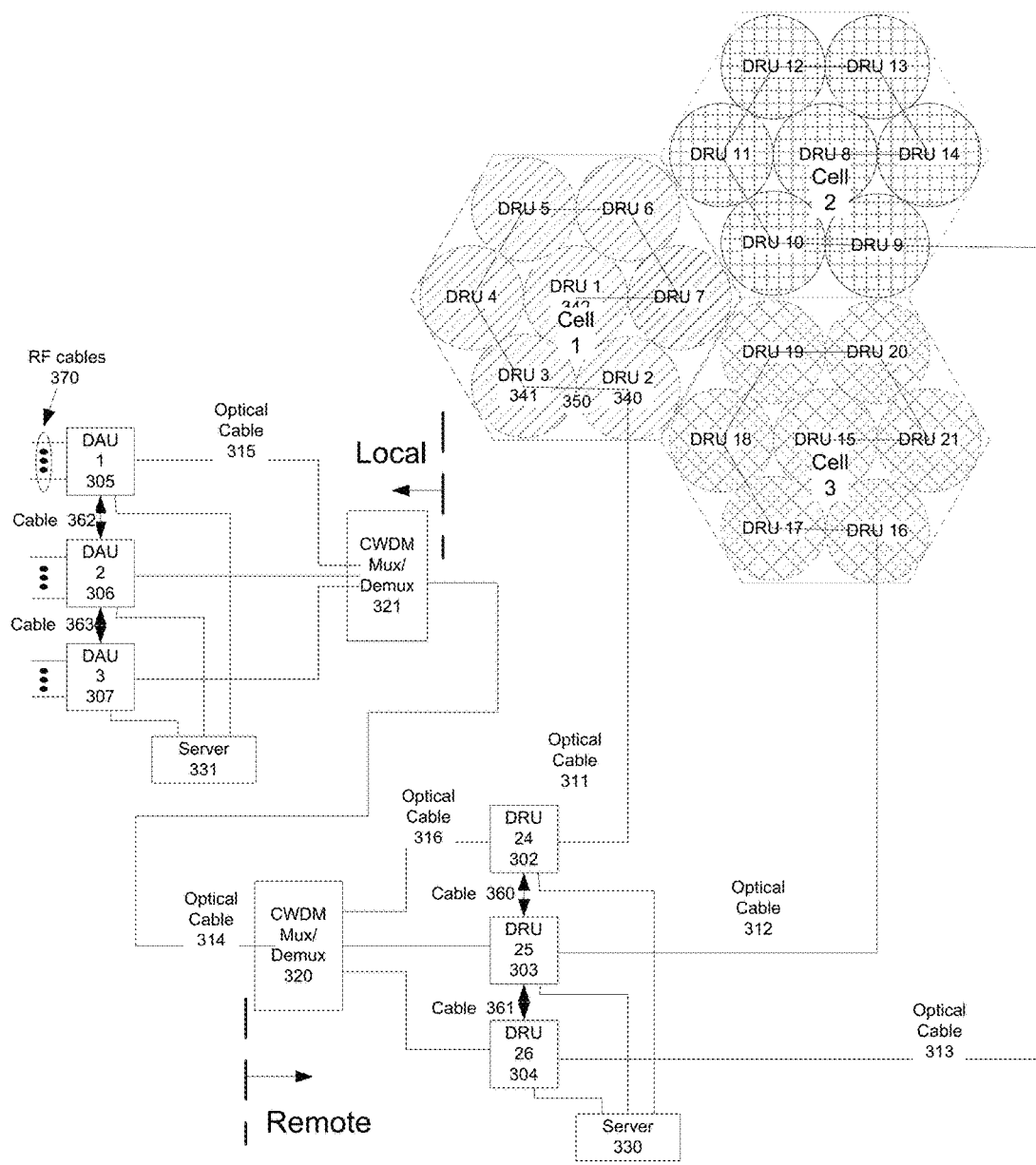
FIG. 3 is a block diagram according to one embodiment of the invention showing the basic structure and an example of the transport routing based on having multiple 3 sector BTSs with 3 DAUs at a Local Location, 3 Digital Remote Units (DRUs) at a Remote Location and Optical interfaces at the Remotes.

FIG. 3 depicts a DAS system employing multiple Digital Access Units (DAUs) at the Local location and multiple Digital Remote Units (DRUs) at the Remote location. In accordance with the present invention, each DRU provides unique information associated with each DRU, which uniquely identifies data received and transmitted by a particular Digital Remote Unit.

DRU 24 (302) is located at the Remote location, and is connected via daisy-chain to 7 additional DRU units that occupy Cell 1 (350). Similarly, DRU 25 (303) connects to a daisy chain of DRUs occupying Cell 3 and DRU 26 (304) connects to a daisy-chain of DRUs occupying Cell 2. The remote DRUs 24, 25 and 26 are interconnected which facilitates the routing of signals between DRUs. The embodiment illustrated in FIG. 3 provides a daisy chain architecture, which can be compared with the star architecture that can be implemented using the embodiment illustrated in FIG. 2, for example, by providing multiple optical outputs from the remote DAUs. As an example, in addition to optical cable 211, an additional optical cable (not shown) could be provided at the output of DAU 2 (202). One of ordinary skill in the art would recognize many variations, modifications, and alternatives.

The servers illustrated herein, for example, server 330 provide unique functionality in the systems described herein. The following discussion related to server 330 may also be applicable to other servers discussed herein as illustrated in the figures. Server 330 can be used to set up the switching matrices to allow the routing of signals between the remote DRUs. The server 330 can also store configuration information, for example, if the system gets powered down or one DRU goes off-line and then you power up the system, it will typically need to be reconfigured. The server 330 can store the information used in reconfiguring the system and/or the DRUs.

Figure 4:
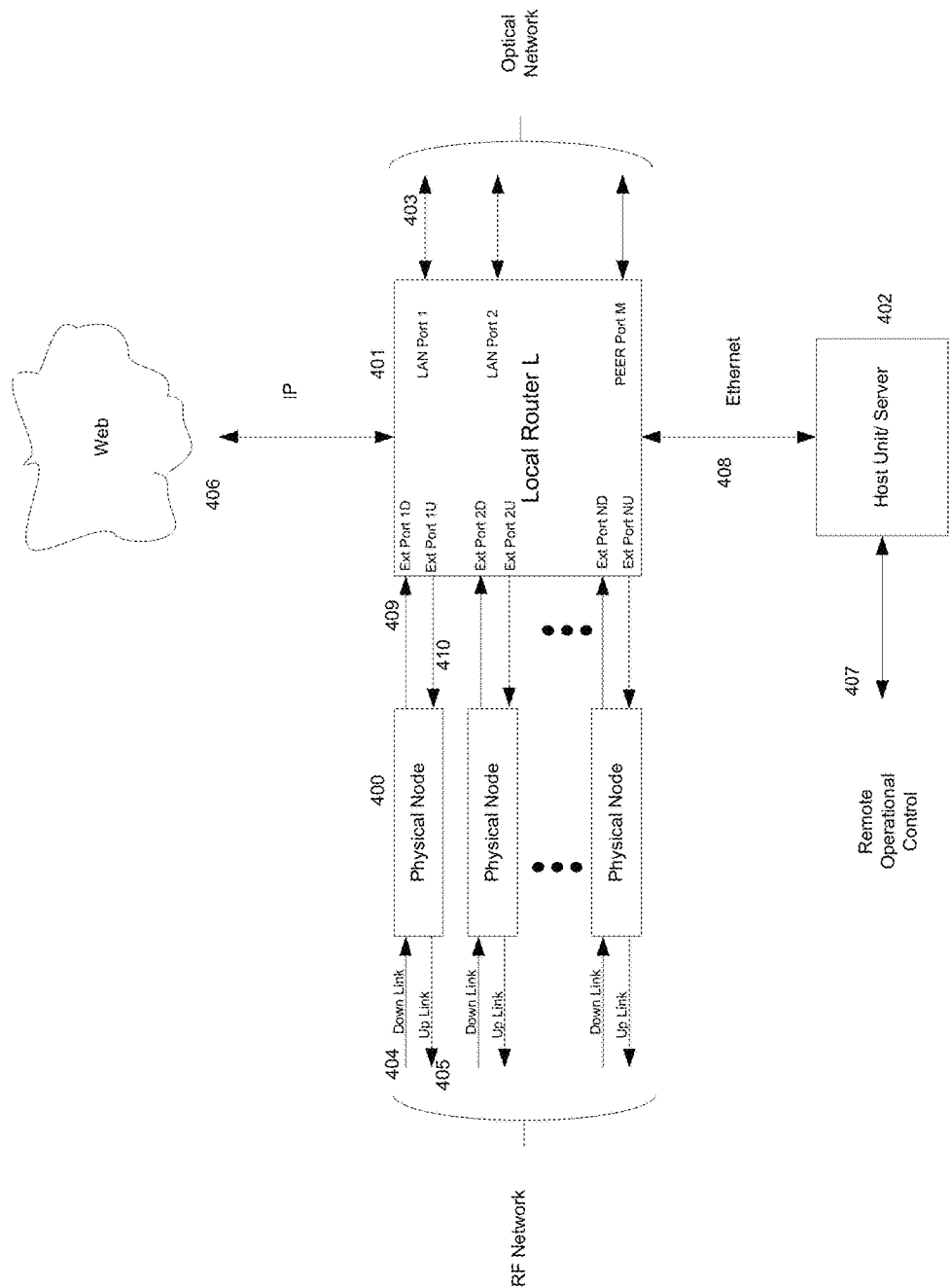
FIG. 4 is a block diagram illustrating a DAU, which contains physical Nodes and a Local Router, according to an embodiment of the present invention.

FIG. 4 shows the two elements in a DAU, the Physical Nodes (400) and the Local Router (401). The Physical Nodes translate the RF signals to baseband for the Downlink and from baseband to RF for the Uplink. The Local Router directs the traffic between the various LAN Ports, PEER Ports and the External Ports. The physical nodes connect to the BTS at radio frequencies (RF). The physical nodes can be used for different operators, different frequency bands, different channels, or the like. The physical nodes can combine the downlink and uplink signals via a duplexer or they can keep them separate, as would be the case for a simplex configuration.

FIG. 4 shows an embodiment whereby the physical nodes have separate outputs for the uplinks (405) and separate inputs for the downlink paths (404). The physical node translates the signals from RF to baseband for the downlink path and from baseband to RF for the uplink path. The physical nodes are connected to a Local Router via external ports (409,410)). The router directs the uplink data stream from the LAN and PEER ports to the selected External U ports. Similarly, the router directs the downlink data stream from the External D ports to the selected LAN and PEER ports.

In one embodiment, the LAN and PEER ports are connected via an optical fiber to a network of DAUs and DRUs. The network connection can also use copper interconnections such as CAT 5 or 6 cabling, or other suitable interconnection equipment. The DAU is also connected to the internet network using IP (406). An Ethernet connection (408) is also used to communicate between the Host Unit and the DAU. The DRU can also connect directly to the Remote Operational Control center (407) via the Ethernet port.

Figure 5:
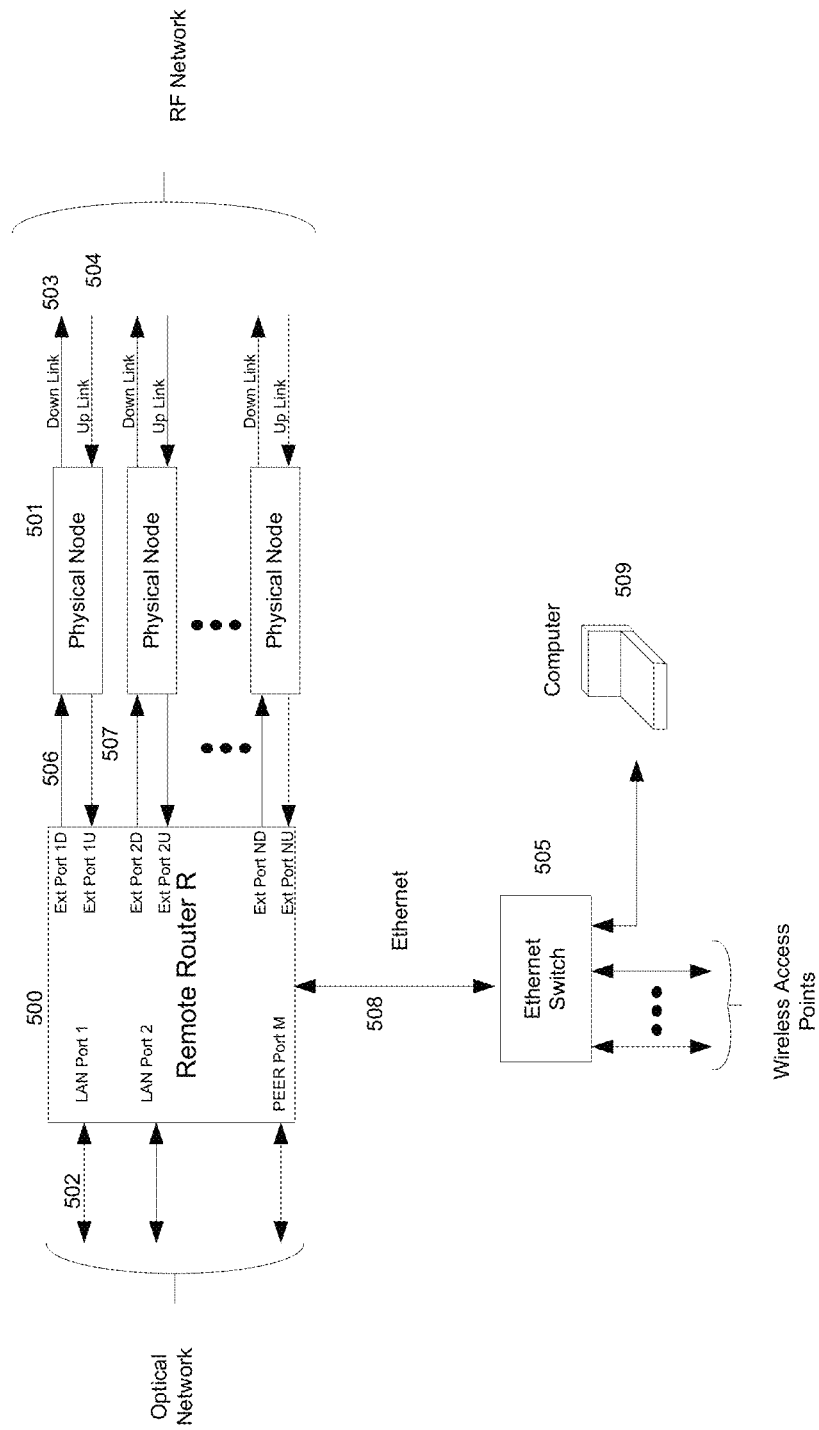
FIG. 5 is a block diagram illustrating a DRU according to an embodiment of the present invention.

FIG. 5 shows the two elements in a DRU, the Physical Nodes (501) and the Remote Router (500). The DRU includes both a Remote Router and Physical Nodes. The Remote Router directs the traffic between the LAN ports, External Ports and PEER Ports. The physical nodes connect to the BTS at radio frequencies (RF). The physical nodes can be used for different operators, different frequency bands, different channels, etc. FIG. 5 shows an embodiment whereby the physical nodes have separate inputs for the uplinks (504) and separate outputs for the downlink paths (503). The physical node translates the signals from RF to baseband for the uplink path and from baseband to RF for the downlink path. The physical nodes are connected to a Remote Router via external ports (506,507). The router directs the downlink data stream from the LAN and PEER ports to the selected External D ports. Similarly, the router directs the uplink data stream from the External U ports to the selected LAN and PEER ports. The DRU also contains a Ethernet Switch (505) so that a remote computer or wireless access points can connect to the internet.

In some embodiments, the DAU is connected to a host unit/server, whereas the DRU does not connect to a host unit/server. In these embodiments, parameter changes for the DRU are received from a DAU, with the central unit that updates and reconfigures the DRU being part of the DAU, which can be connected to the host unit/server. Embodiments of the present invention are not limited to these embodiments, which are described only for explanatory purposes.

It is also understood that the examples and embodiments described herein are for illustrative purposes only and that various modifications or changes in light thereof will be suggested to persons skilled in the art and are to be included within the spirit and purview of this application and scope of the appended claims.

Table 1 is a glossary of terms used herein, including acronyms.

TABLE 1

Glossary of Terms

| | |
|---|---|
| ACLR | Adjacent Channel Leakage Ratio |
| ACPR | Adjacent Channel Power Ratio |
| ADC | Analog to Digital Converter |
| AQDM | Analog Quadrature Demodulator |
| AQM | Analog Quadrature Modulator |
| AQDMC | Analog Quadrature Demodulator Corrector |
| AQMC | Analog Quadrature Modulator Corrector |
| BPF | Bandpass Filter |
| CDMA | Code Division Multiple Access |
| CFR | Crest Factor Reduction |
| DAC | Digital to Analog Converter |
| DET | Detector |
| DHMPA | Digital Hybrid Mode Power Amplifier |
| DDC | Digital Down Converter |
| DNC | Down Converter |
| DPA | Doherty Power Amplifier |
| DQDM | Digital Quadrature Demodulator |
| DQM | Digital Quadrature Modulator |
| DSP | Digital Signal Processing |
| DUC | Digital Up Converter |
| EER | Envelope Elimination and Restoration |
| EF | Envelope Following |
| ET | Envelope Tracking |
| EVM | Error Vector Magnitude |
| FFLPA | Feedforward Linear Power Amplifier |
| FIR | Finite Impulse Response |
| FPGA | Field-Programmable Gate Array |
| GSM | Global System for Mobile communications |
| I-Q | In-phase/Quadrature |
| IF | Intermediate Frequency |
| LINC | Linear Amplification using Nonlinear Components |
| LO | Local Oscillator |
| LPF | Low Pass Filter |
| MCPA | Multi-Carrier Power Amplifier |
| MDS | Multi-Directional Search |
| OFDM | Orthogonal Frequency Division Multiplexing |
| PA | Power Amplifier |
| PAPR | Peak-to-Average Power Ratio |
| PD | Digital Baseband Predistortion |
| PLL | Phase Locked Loop |
| QAM | Quadrature Amplitude Modulation |
| QPSK | Quadrature Phase Shift Keying |
| RF | Radio Frequency |
| RRH | Remote Radio Head |
| RRU | Remote Radio Head Unit |
| SAW | Surface Acoustic Wave Filter |
| UMTS | Universal Mobile Telecommunications System |
| UPC | Up Converter |
| WCDMA | Wideband Code Division Multiple Access |
| WLAN | Wireless Local Area Network |

What is claimed is:

1. A system for routing signals in a Distributed Antenna System (DAS), the system comprising:
one or more local Digital Access Units (DAUs) located at a local location, each of the one or more local DAUs being coupled to each other and operable to route signals between the one or more local DAUs and including an optical port coupled to an upstream unit; and one or more remote DAUs located at one or more remote locations, wherein the one or more remote DAUs are coupled to the one or more local DAUs via one or more optical cables.

2. The system of claim 1 wherein a distance between the local location and each of the one or more remote locations is greater than two kilometers.

3. The system of claim 1 wherein the system includes two or more local DAUs located at the local location and one remote DAU located at a remote location.

4. The system of claim 1 wherein the system includes two or more local DAUs located at the local location and two or more remote DAUs located at a remote location.

5. The system of claim 1 wherein the system includes two or more local DAUs located at the local location and two or more remote DAUs located at two or more remote locations, and wherein one or more remote DAUs are located at each of the one or more remote locations.

6. The system of claim 1 further comprising a local mux/demux coupled to the one or more local DAUs and a remote mux/demux coupled to the one or more remote DAUs, wherein the local mux/demux and the remote mux/demux are connected via an optical fiber.

7. The system of claim 6 wherein the local mux/demux and the remote mux/demux comprise at least one of a CWDM or a DWDM system.

8. The system of claim 1 wherein the one or more local DAUs are connected to the one or more remote DAUs via at least one CWDM mux/demux and at least one optical cable.

9. The system of claim 1 wherein each of the one or more local DAUs is coupled to the one or more remote DAUs via an optical cable.

10. The system of claim 1 wherein the one or more remote DAUs are coupled to each other and operable to route signals between the one or more remote DAUs.

11. The system of claim 1 wherein each remote DAU is coupled to a plurality of Digital Remote Units (DRUs) arranged in a cell.

12. The system of claim 1 wherein the upstream unit includes at least one of a repeater, a baseband unit, a Base Transceiver Station (BTS), or a DAU.

13. A method of routing signals in a Distributed Antenna System (DAS), the method comprising:
   providing one or more local Digital Access Units (DAUs) at a local location, each of the one or more local DAUs being coupled to each other and operable to route signals between the one or more local DAUs and including an optical port;
   coupling, using the optical port, each of the one or more local DAUs to an upstream unit;
   providing one or more remote DAUs at one or more remote locations; and
   coupling the one or more remote DAUs to the one or more local DAUs via one or more optical cables.

14. The method of claim 13 wherein two or more local DAUs are provided at the local location and one remote DAU is provided at a remote location.

15. The method of claim 13 wherein two or more local DAUs are provided at the local location and two or more remote DAUs are provided at a remote location.

16. The method of claim 13 wherein two or more local DAUs are provided at the local location and two or more remote DAUs are provided at two or more remote locations, and wherein one or more remote DAUs are provided at each of the one or more remote locations.

17. The method of claim 13 wherein the one or more local DAUs are connected to the one or more remote DAUs via at least one CWDM or DWDM mux/demux and at least one optical cable.

18. The method of claim 13 further comprising coupling each remote DAU to a plurality of Digital Remote Units (DRUs) arranged in a cell.

19. The method of claim 13 wherein the upstream unit includes at least one of a repeater, a baseband unit, a Base Transceiver Station (BTS), or a DAU.

* * * * *